(12) United States Patent
Kismir

(10) Patent No.: US 7,614,643 B2
(45) Date of Patent: Nov. 10, 2009

(54) INFLATABLE CURTAIN AIR-BAG

(75) Inventor: Altay Kismir, Tilbury (CA)

(73) Assignee: Autoliv Development AB, Vargarda (SE)

( * ) Notice: Subject to any disclaimer, the term of this patent is extended or adjusted under 35 U.S.C. 154(b) by 291 days.

(21) Appl. No.: 10/550,717

(22) PCT Filed: Jan. 16, 2004

(86) PCT No.: PCT/SE2004/000045
§ 371 (c)(1),
(2), (4) Date: Jul. 20, 2006

(87) PCT Pub. No.: WO2004/085210
PCT Pub. Date: Oct. 7, 2004

(65) Prior Publication Data
US 2007/0040358 A1 Feb. 22, 2007

(30) Foreign Application Priority Data
Mar. 24, 2003 (GB) .................. 0306749.3

(51) Int. Cl.
*B60R 21/213* (2006.01)
(52) U.S. Cl. .................. 280/728.2; 280/730.2
(58) Field of Classification Search .............. 280/728.2, 280/730.2
See application file for complete search history.

(56) References Cited

U.S. PATENT DOCUMENTS

| | | | |
|---|---|---|---|
| 5,588,672 A | 12/1996 | Karlow et al. | |
| 5,791,683 A * | 8/1998 | Shibata et al. | 280/730.2 |
| 5,951,038 A | 9/1999 | Taguchi et al. | |
| 6,010,149 A * | 1/2000 | Riedel et al. | 280/730.2 |
| 6,073,961 A | 6/2000 | Bailey et al. | |
| 6,095,551 A * | 8/2000 | O'Docherty | 280/730.2 |
| 6,168,190 B1 * | 1/2001 | Bowers et al. | 280/730.2 |
| 6,199,898 B1 | 3/2001 | Masuda et al. | |
| 6,203,058 B1 | 3/2001 | Elqadah et al. | |
| 6,227,561 B1 | 5/2001 | Jost et al. | |
| 6,231,073 B1 | 5/2001 | White, Jr. | |
| 6,273,456 B1 | 8/2001 | Heigl | |
| 6,293,581 B1 | 9/2001 | Saita et al. | |
| 6,299,199 B1 | 10/2001 | Bowers et al. | |
| 6,325,409 B1 * | 12/2001 | Fischer | 280/730.2 |
| 6,332,628 B1 * | 12/2001 | Tschaeschke | 280/730.2 |
| 6,334,625 B1 | 1/2002 | Pausch et al. | |
| 6,336,654 B1 | 1/2002 | Stein et al. | |
| 6,386,578 B1 * | 5/2002 | Nanbu et al. | 280/730.2 |
| 6,409,211 B1 | 6/2002 | Sheng et al. | |

(Continued)

FOREIGN PATENT DOCUMENTS

DE 198 07 572 A1 8/1999

(Continued)

*Primary Examiner*—Paul N Dickson
*Assistant Examiner*—Laura Freedman
(74) *Attorney, Agent, or Firm*—Brinks Hofer Gilson & Lione

(57) ABSTRACT

An air-bag is disclosed which preferably takes the form of an inflatable curtain The air-bag forms at least one inflatable region (3,6) and has an upper edge (14) provided with a plurality of mounting tabs (20,21,22,23). Each mounting tab (20,21,22,23) defines an axis which is inclined inwardly toward a region above the centre of the air-bag. Preferably, each tab is inclined at an angle between 30° and 70°.

6 Claims, 1 Drawing Sheet

U.S. PATENT DOCUMENTS

| | | |
|---|---|---|
| 6,428,037 B1 | 8/2002 | Bakhsh et al. |
| 6,431,587 B1 | 8/2002 | O'Docherty |
| 6,450,529 B1 | 9/2002 | Kalandek et al. |
| 6,464,250 B1 | 10/2002 | Faigle et al. |
| 6,616,178 B1 * | 9/2003 | Nanbu .................. 280/730.2 |
| 6,712,386 B2 * | 3/2004 | Fischer .................. 280/730.2 |
| 6,945,556 B2 * | 9/2005 | Maertens .................. 280/729 |
| 2001/0019201 A1 | 9/2001 | Masuda et al. |
| 2001/0026062 A1 * | 10/2001 | Kosugi et al. ............ 280/730.2 |
| 2001/0045729 A1 | 11/2001 | Mueller |
| 2002/0014762 A1 | 2/2002 | Bakhsh et al. |
| 2002/0020991 A1 | 2/2002 | Tanase et al. |
| 2002/0036396 A1 | 3/2002 | Fischer |
| 2002/0056974 A1 | 5/2002 | Webert |
| 2002/0105173 A1 | 8/2002 | Saderholm et al. |
| 2002/0125693 A1 | 9/2002 | Alsup et al. |
| 2002/0125697 A1 * | 9/2002 | Heigl .................. 280/730.2 |
| 2002/0140211 A1 | 10/2002 | Takahara |
| 2002/0153713 A1 * | 10/2002 | Fischer .................. 280/730.2 |
| 2002/0163167 A1 | 11/2002 | Hill |
| 2002/0175502 A1 | 11/2002 | Tesch et al. |
| 2002/0195804 A1 | 12/2002 | Hess et al. |
| 2003/0047918 A1 * | 3/2003 | Hill .................. 280/730.2 |
| 2004/0104561 A1 * | 6/2004 | Maertens .................. 280/730.2 |

FOREIGN PATENT DOCUMENTS

| | | |
|---|---|---|
| DE | 198 50 448 | 5/2000 |
| DE | 199 39 618 A1 | 5/2000 |
| DE | 100 21 576 | 11/2000 |
| DE | 200 15 065 | 2/2001 |
| DE | 200 16 717 U1 | 3/2001 |
| EP | 0 955 215 A2 | 11/1999 |
| EP | 1 205 362 A2 | 5/2002 |
| EP | 1 238 865 | 9/2002 |
| GB | 2 314 300 | 12/1997 |
| GB | 2 357 467 | 6/2001 |
| JP | 11-321536 | 11/1999 |
| JP | 2000 335356 | 12/2000 |
| JP | 2002 200959 | 7/2002 |
| JP | 2003 063348 | 3/2003 |
| WO | WO 99/42333 | 8/1999 |
| WO | WO 03/018372 | 3/2003 |
| WO | WO 03/051679 | 6/2003 |
| WO | WO 03/051680 | 6/2003 |
| WO | WO 03/078214 | 9/2003 |
| WO | WO 2004/000609 | 12/2003 |
| WO | WO 2004/007250 | 1/2004 |

* cited by examiner

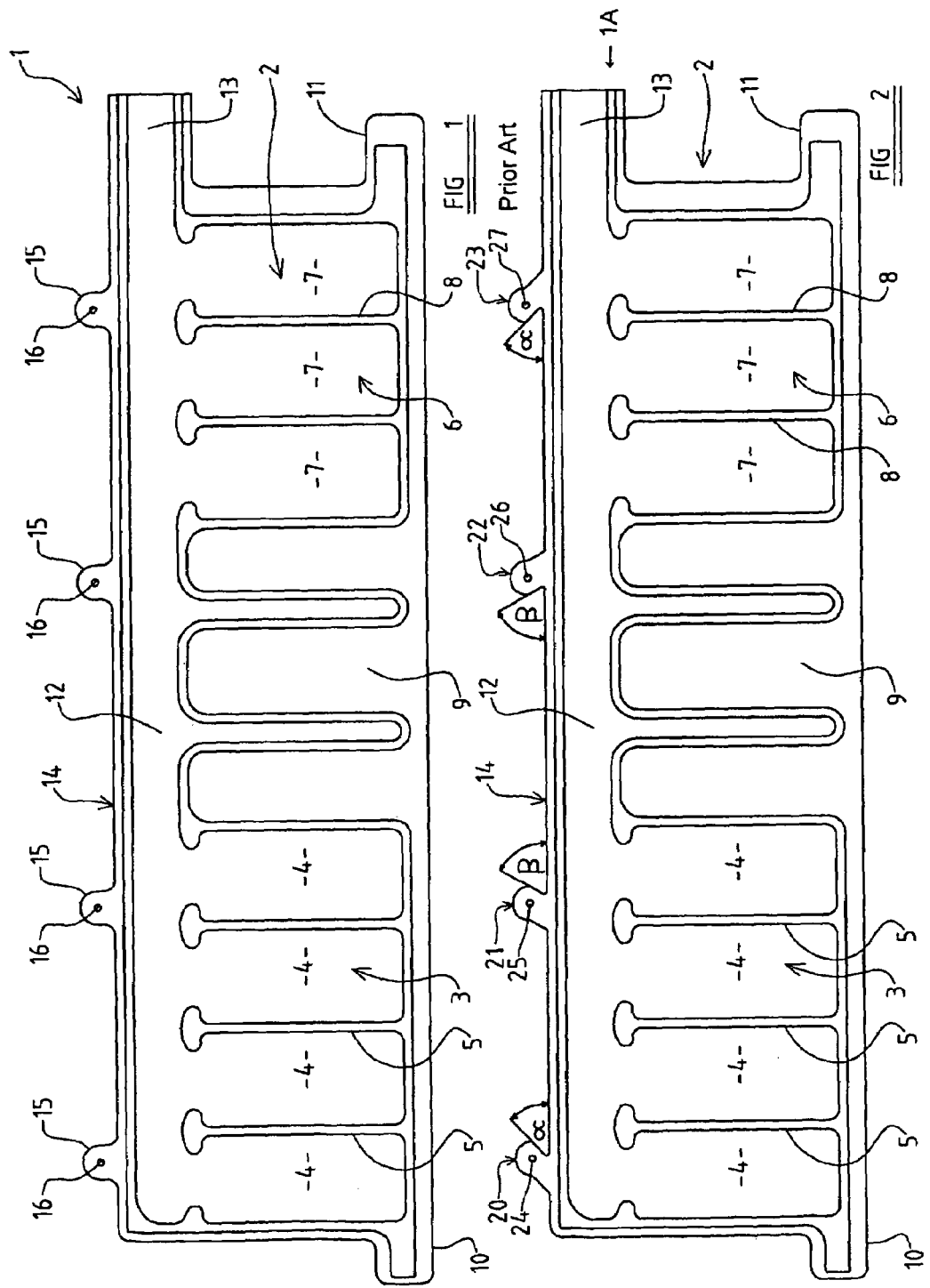

US 7,614,643 B2

INFLATABLE CURTAIN AIR-BAG

CROSS REFERENCE TO RELATED APPLICATIONS

This application claims priority to British patent application number 0306749.3, filed Mar. 24, 2003 and PCT/SE2004/000045, filed Jan. 16, 2004.

FIELD OF THE INVENTION

The present invention relates to an air-bag and more particularly relates to an air-bag in the form of an inflatable curtain.

BACKGROUND OF THE INVENTION

It has been proposed previously to provide an air-bag in the form of an inflatable curtain, the air-bag being configured to be mounted in a motor vehicle along the roof line of the vehicle above the doors. The air-bag is associated with a gas generator to inflate the air-bag in the event that an accident should occur. The inflated air-bag is intended to extend between an occupant of the vehicle and the adjacent doors.

Many designs of inflatable curtain have been proposed previously but reference is made to FIG. 1 of the accompanying drawings which illustrates a typical design.

Referring initially to FIG. 1, an air-bag 1 in the form of an inflatable curtain in accordance with the prior art has a main region 2 of generally rectangular form, the main region incorporating a first inflatable zone 3 divided into a plurality of cells 4 by seams 5, and a second inflatable zone 6 divided into cells 7 by means of seams 8. The two inflatable zones 3 and 6 are separated by a substantially uninflatable zone 9.

A first projection 10 is provided at one end of the lower edge of the inflatable curtain, to be connected to a strap, and a further projection 11 is provided at the other end of the lower edge to be connected to a further strap.

Along the upper edge of the air-bag, a gas flow duct 12 is provided which communicates with the inflatable cells of the first zone 3 and the inflatable cells of the second zone 6. The gas duct 12 is provided with an end portion 13 configured to be connected to a gas generator. The uppermost edge 14 of the air-bag is provided with a plurality of evenly spaced mounting tabs 15 each being provided with an aperture 16.

The air-bag as described is one example of many different designs of air-bag of the inflatable-curtain type that are in use.

In the described arrangement, the mounting tabs 15 are formed of a single layer of fabric. However, it has been found that the mounting tabs 15 may not be sufficiently strong to withstand the forces applied to the mounting tabs during deployment of the air-bag. Here it is to be understood that the air-bag is deployed within a very brief period of time in response to a signal from a sensor responsive to a side impact or rollover situation. The gas that inflates the air-bag is injected into the gas flow duct 12 in a very aggressive manner, and it is not unknown for the mounting tabs 15 to become damaged as a result.

It has been proposed to modify the mounting tabs either by providing a stitched re-enforcement or, alternatively, by forming the tabs by initially providing an over-sized piece of fabric at the position where each tab is to be, and then folding the fabric over and effecting a stitching operation to provide a mounting tab of enhanced strength. Such techniques are, however, undesirable as they are labour intensive and therefore costly.

SUMMARY OF THE INVENTION

The present invention seeks to provide an improved air-bag.

Accordingly, the present invention provides an air-bag, the air-bag comprising at least one inflatable region, the air bag having an upper edge provided with a plurality of mounting tabs, each mounting tab defining an axis, the axis of each mounting tab being inclined inwardly toward a region above the centre of the air-bag.

Preferably, the air-bag is in the form of an inflatable curtain.

Advantageously, each tab is inclined at an angle between 30° and 80°.

Conveniently, the tabs located towards each end of the air-bag are inclined with a more acute angle than tabs located towards the centre of the air-bag.

Preferably, each tab is formed of woven fabric, the fabric having orthogonal warp yarns and weft yarns, the axis of each tab making an acute angle with the orthogonal matrix of the warp and weft yarns.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 1, as described above, is a diagrammatic view of a prior proposed air-bag; and FIG. 2 is a corresponding diagrammatic view of an air-bag in accordance with the invention.

DETAILED DESCRIPTION OF THE INVENTION

As will be appreciated, most of the features of the air-bag of FIG. 2 are the same as the corresponding features of the air-bag of FIG. 1 and will thus not be re-described in detail at this time.

The primary difference between the air-bag 1A of FIG. 2 and the air-bag 1 of FIG. 1 is the nature of the mounting tabs. The upper edge 14 of the air-bag 2 shown in FIG. 2 is provided with four mounting tabs 20, 21, 22, 23 spaced from one another at respective positions along the upper edge 14. Each mounting tab is in the form a single thickness layer of fabric and each tab is provided with a respective bolt hole 24, 25, 26, 27.

It can be seen that the tabs 20,21,22,23 do not extend perpendicularly from the upper edge 14, but instead each tab 20,21,22,23 is inclined to define an acute angle with the upper edge 14 of the air-bag 1A.

The left-hand most tab 20 is inclined to the upper edge 14 at an angle α which may be between 30° and 80° but which, in the described embodiment, is approximately 45°. The tab 20 is thus inclined quite steeply relative to the uppermost edge 14 of the inflatable curtain air-bag 1A.

The next adjacent tab, moving towards the centre of the air-bag, is the tab 21 which is inclined at an angle β, the angle β again being between 30° and 80° but in the illustrated embodiment being 63°. Thus the tab 21 is not inclined as steeply as the first described tab 20. Both of the tabs 20 and 21 are inclined in a direction towards a point located above the centre of the air-bag.

The next adjacent tab, the tab 22, is on the opposite side of the central part of the air-bag and again is inclined relative to the upper edge 14 at the angle β which, in the described embodiment, is 63°, but is inclined in the opposite sense relative to the tab 21, thus again being inclined towards the said point located above the centre of the air-bag.

Finally the tab 23 is inclined at the angle α which is again 45°, again being inclined towards the central point above the centre of the air-bag. It will therefore be seen that the illustrated arrangement has a substantially symmetrical arrangement of the tab angles, about a line of symmetry lying vertically through the central region of the air-bag. However, in other embodiments (not illustrated), it is possible for the tab angles to be arranged in a non-symmetrical manner.

In a conventional air-bag of the type described above, the warp and weft yarns are co-aligned with and perpendicular to the upper edge 14 of the air-bag. Thus, as the tabs 20, 21, 22, 23 are formed from the fabric of the air-bag, each tab is inclined to the orthogonal axes defined by the warp and weft yarns by either the angle α or the angle β.

It has been found that a tab which is inclined to the warp or weft direction is able to elongate with a given load to a greater extent than a tab which is aligned with the warp or weft axes of the fabric (as in the case of tabs 15 and 16 of FIG. 1). It is thus envisaged that an air-bag 1A provided with tabs as described above will be able to withstand substantial applied forces, with the loads from those forces being absorbed by the tabs, without the tabs breaking.

The tabs may be woven using a conventional hop-sack weave.

While the above description constitutes the preferred embodiment of the present invention, it will be appreciated that the invention is susceptible to modification, variation and change without departing from the proper scope and fair meaning of the accompanying claims.

The invention claimed is:

1. An air-bag for a motor vehicle, comprising at least one inflatable region, the air bag having an upper edge provided with a plurality of mounting tabs, each of the tabs having an outer edge and an inner edge, the inner and the outer edges extending from the upper edge, wherein the inner edge is nearer a line lying vertically through a central region of the air-bag than is the outer edge, and the inner edge and the upper edge define an angle of less than 90° such that the tabs are inclined inwardly towards the line.

2. An air-bag according to claim 1 wherein the air-bag is in the form of an inflatable curtain.

3. An air-bag according to claim 1 wherein at least one of the tabs defines an angle between 30° and 80°.

4. An air-bag according to claim 1 wherein the upper edge is provided with the tabs including a first group of the tabs positioned near the line lying vertically through the central region of the air-bag and a second group of the tabs positioned outwardly from the line lying vertically through the central region wherein the angle defined by the second group of the tabs being a more acute angle than the angle first defined by the group of the tabs.

5. An air-bag according to claim 1 wherein each of the plurality of the tabs is formed of a woven fabric, the fabric having orthogonal warp yarns and weft yarns, the tabs defining an acute angle with the orthogonal matrix of the warp and the weft yarns.

6. An air-bag according to claim 1 wherein each of the plurality of the tabs comprises a single layer of fabric forming the air-bag.

* * * * *